United States Patent
Aoyama et al.

(10) Patent No.: US 7,148,647 B2
(45) Date of Patent: Dec. 12, 2006

(54) NUMERICAL CONTROL DEVICE

(75) Inventors: Kazunari Aoyama, Yamanashi (JP);
Kunitaka Komaki, Yamanashi (JP);
Yasuharu Aizawa, Yamanashi (JP)

(73) Assignee: Fanuc Ltd, Yamanashi (JP)

(*) Notice: Subject to any disclaimer, the term of this patent is extended or adjusted under 35 U.S.C. 154(b) by 0 days.

(21) Appl. No.: 11/239,167

(22) Filed: Sep. 30, 2005

(65) Prior Publication Data

US 2006/0022629 A1   Feb. 2, 2006

(30) Foreign Application Priority Data

Oct. 7, 2004   (JP)   ............................. 2004-295300

(51) Int. Cl.
*G05B 19/18*   (2006.01)
*G05B 19/4062*   (2006.01)

(52) U.S. Cl. ...................... 318/569; 318/600; 318/601; 318/604

(58) Field of Classification Search ...................... None
See application file for complete search history.

(56) References Cited

U.S. PATENT DOCUMENTS

| | | | | |
|---|---|---|---|---|
| 4,310,878 A | * | 1/1982 | Hyatt | 318/608 |
| 5,285,378 A | * | 2/1994 | Matsumoto | 700/37 |
| 6,566,836 B1 | * | 5/2003 | Matsubara et al. | 318/600 |
| 6,628,097 B1 | * | 9/2003 | Endo et al. | 318/569 |
| 6,956,505 B1 | * | 10/2005 | Taniguchi et al. | 341/11 |
| 6,961,637 B1 | * | 11/2005 | Scherer | 700/173 |
| 2004/0207357 A1 | * | 10/2004 | Aoyama et al. | 318/625 |

* cited by examiner

*Primary Examiner*—Lincoln Donovan
*Assistant Examiner*—Eduardo Colon Santana
(74) *Attorney, Agent, or Firm*—Staas & Halsey LLP

(57) ABSTRACT

An analog amplifier performs control of a motor at the speed in proportion to a speed instruction (analog voltage) outputted from a numerical control device. The speed instruction (analog value) is converted into a digital value by an A/D converter and is then sent to a CPU. When the CPU judges that the received digital value corresponding to the speed instruction deviates from a predetermined range, the CPU stops sending out an enable signal, and sends out an emergency stop signal. As a result, the CPU stops electric power supply to the analog amplifier, and also invalidates the speed instruction sent to the analog amplifier 20, thereby performing control to make the speed of the motor become "0".

4 Claims, 6 Drawing Sheets

FIG. 3

|  | DIGITAL VALUE AFTER A/D CONVERSION (BINARY) | JUDGMENT |
|---|---|---|
| −15V | 00000000 | ABNORMAL |
| −10V | 00101010 | NORMAL |
| 0V | 10000000 | NORMAL |
| +10V | 11010101 | NORMAL |
| +15V | 11111111 | ABNORMAL |

NUMERICAL CONTROL DEVICE

BACKGROUND OF THE INVENTION

1. Field of the Invention

The present invention relates to a numerical control device which controls a machine tool and the like.

2. Description of the Related Art

FIG. 5 shows a system configuration of a motor subjected to an analog spindle control performed by a numerical control device. An analog voltage (a speed instruction) for analog spindle control is applied to an amplifier of a motor (for example, a main spindle motor) from a numerical control device 10 and the motor is rotated at the speed in proportion to the applied analog voltage.

Specifically, the numerical control device 10 normally outputs an analog voltage from −10 V to +10V to an analog amplifier 20 as speed instruction for analog spindle control. The analog amplifier 20 amplifies electric power supplied via an electromagnetic switch 21 from a three phase AC power source 22 for motor driving in proportion to the analog voltage of the speed instruction, and supplies current to a motor 23 via a power line 24. Thereby, the motor 23 is rotated at a rotation speed corresponding to the speed instruction (analog voltage). At this time, the rotation speed of the motor 23 is detected by a speed detector 25, and the detected speed signal is fed back to the analog amplifier 20. The analog amplifier 20 controls current output so as to make the detected speed the same as the instruction speed.

Thus, in the analog spindle control of the numerical control device 10, the speed of the motor 23 can be instructed by an analog voltage. However, an analog voltage generated in practice, necessarily includes an error with respect to the speed instructed by the numerical control device 10, and an error is also generated on the side of the analog amplifier 20 receiving the instruction. As a result, the speed of the motor 23 is not completely coincident with the instruction speed. This becomes a problem in particular when a speed "0" is instructed. That is, there arises a problem that in spite of the fact that a speed 0 is instructed, the motor rotates at a low speed (at a speed not equal to 0) due to the error of the analog voltage.

In order to avoid such phenomenon, an enable signal which indicates the validity or invalidity of the speed instruction signal is sent out from the numerical control device 10 to the analog amplifier 20 at the same time with and in addition to the above described speed instruction. That is, when the numerical control device 10 performs control to instruct the speed 0, it stops sending out the enable signal and invalidates the instructed analog voltage. On the other hand, when the numerical control device 10 instructs the speed other than 0, it performs control to send out the enable signal and to validate the analog signal.

The analog amplifier 20 judges the speed instruction as valid while receiving the enable signal. If the sending out of the enable signal is stopped, the analog amplifier 20 performs control so as to make the speed of the motor become "0". Alternatively, the current output to the motor via the power line 24 is stopped.

The numerical control device 10 outputs an emergency stop signal, and performs ON/OFF control of the electromagnetic switch which interrupts the electric power supplied to the analog amplifier 20 from the three phase AC power source 22 for motor driving. This emergency stop signal is for interrupting the electric power supplied to the analog amplifier 20, in an alarm state of the numerical control device 10, or at the time of an emergency stopping of the numerical control device 10, such as when the emergency stop button is pushed by an operator. The emergency stop signal may be directly outputted from the numerical control device 10, or may be outputted through an I/O unit and the like, connected with the numerical control device 10.

FIG. 6 is a block diagram showing a main part of the conventional numerical control device 10, which is essentially constituted by circuits outputting a speed instruction, an enable signal and an emergency stop signal.

A CPU (processing unit) 11 obtains the speed instruction for performing analog spindle control, and determines an analog voltage output value corresponding to the obtained speed instruction, and writes a digital value corresponding to the determined output value into a D/A (digital/analog) converter 12. The D/A converter 12 converts the written digital value to an analog value and outputs the converted analog value. An amplifier 13 amplifies the outputted analog voltage. Then, the amplifier 13 outputs the amplified analog voltage to the analog amplifier 20 as a speed instruction.

The CPU 11 outputs a speed instruction (digital value) to the D/A converter 12 when the speed instruction value is a value other than "0". At the same time, the CPU 11 performs writing for sending out an enable signal, into a driver 16 which outputs the enable signal. On the other hand, when the speed instruction value is "0", the CPU 11 performs writing for stopping sending out the enable signal, into the driver 16.

When an alarm is generated, or when an emergency stop button (not shown) is pushed, the CPU 11 outputs an emergency stop signal via a driver 17, and opens the electromagnetic switch 21 so as to make the electric power supplied to the analog amplifier 20 interrupted.

In the numerical control device 10 performing the analog spindle control operation as described above, when a failure occurs in the D-A converter 12 which converts the speed instruction of a digital value into an analog voltage, and the amplifier 13 which amplifies the output voltage of the D-A converter 12 and outputs the amplified analog voltage as the speed instruction, and the like, an abnormal analog voltage is outputted, and hence, the motor 23 may not be moved at the speed as instructed by the CPU 11. The conventional numerical control device is not provided with a system for checking whether the analog voltage outputted as the speed instruction is normal or not, so that a machine and device such as a machine tool, which are controlled by the numerical control device, may perform an abnormal operation. This is not preferred and dangerous. For example, in the case where the motor under the analog spindle control is a main spindle motor of a machine tool, such failure causes the main spindle to abnormally rotate. As a result, when normal working can not be performed, a tool breakage and the like may occur.

SUMMARY OF THE INVENTION

The present invention relates to a numerical control device which converts a speed instruction of digital value to an analog voltage and outputs the analog voltage to an analog amplifier which rotates a motor at the speed in proportion to the analog voltage.

A first embodiment of the numerical control device according to the present invention comprises: an A/D converter converting an analog voltage of a speed instruction into a digital value; monitoring means for monitoring the digital value converted by the A/D converter, and judging whether the digital value is within a predetermined range or not; and enable signal sending means for sending out an enable signal notifying validity of the analog voltage, to an analog amplifier. When the monitoring means judges that the digital value deviates from the predetermined range, the sending out of the enable signal by the enable signal sending means is stopped, and an instruction to stop driving the motor or an instruction to stop the electric power supply to the motor is sent to the analog amplifier.

A second embodiment of the numerical control device according to the present invention comprises: an A/D converter converting an analog voltage of a speed instruction into a digital value; monitoring means for monitoring the digital value converted by the A/D converter, and judging whether the digital value is within a predetermined range or not; and emergency stop signal sending means for sending out an emergency signal for interrupting electric power inputted into an analog amplifier. When the monitoring means judges that the digital value deviates from the predetermined range, the emergency stop signal is sent out by the emergency stop signal sending means, and the electric power inputted into the analog amplifier is interrupted.

In the numerical control device of the first and second embodiments, the above described monitoring means may be replaced with monitoring means for comparing the speed instruction of the digital value with the digital value converted by the A/D converter, and judging whether the difference between the digital values is within a predetermined range or not.

As described above, the numerical control device according to the present invention makes it possible to detect abnormality of analog voltage of a speed instruction in an analog spindle control, whereby abnormal rotation and malfunction of the motor can be prevented.

BRIEF DESCRIPTION OF THE DRAWINGS

The above and other objects and features of the present invention will be apparent from the following description of the preferred embodiments with reference to the drawings, wherein:

FIG. 3 is a table showing an example of judgment on whether a digital value (output from the A/D converter 15 in FIG. 1) corresponding to a speed instruction (analog value) is normal or not;

DETAILED DESCRIPTION OF THE PREFERRED EMBODIMENTS

Figure 1:
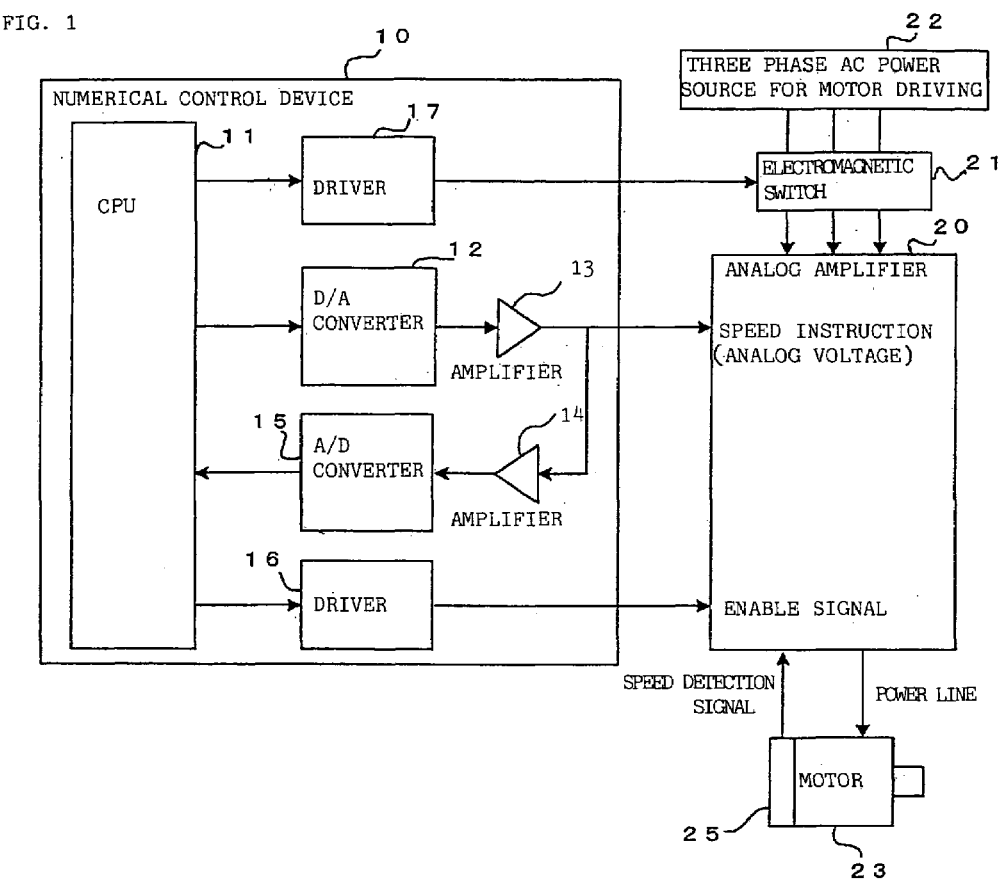
FIG. 1 shows a main part of a numerical control device of an embodiment according to the present embodiment, and a system configuration of an analog spindle motor drive control performed by the numerical control device.

FIG. 1 shows a main part of a numerical control device of an embodiment according to the present embodiment, and a system configuration of analog spindle motor drive control performed by the numerical control device.

Figure 6:
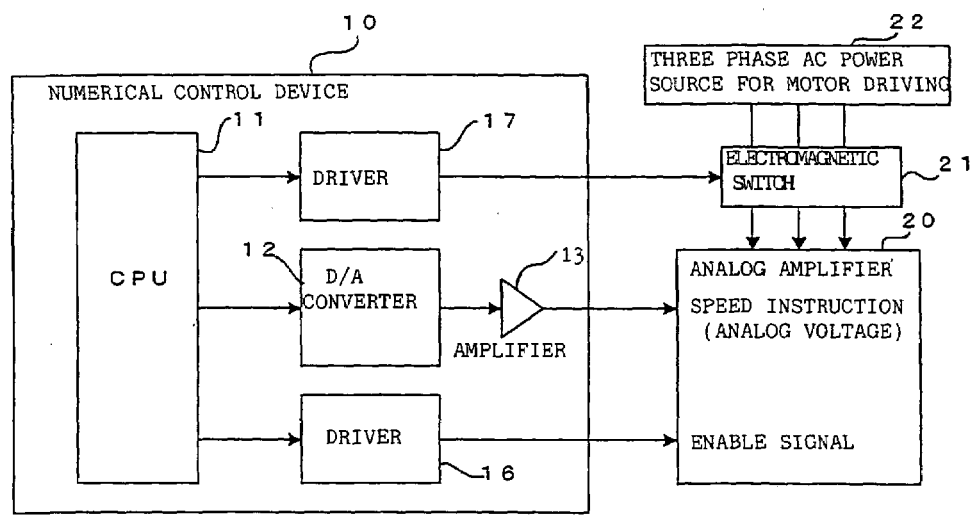
FIG. 6 is a block diagram of a main part of the numerical control device constituting the motor control system shown in FIG. 5, which is essentially constituted by circuits for sending out a speed instruction, an enable signal and an emergency stop signal.

The system of analog spindle motor drive control performed by the numerical control device shown in FIG. 1 is different from the system of analog spindle motor drive control performed by the conventional numerical control device shown in FIG. 6, in that the system shown in FIG. 1 comprises an amplifier 14 which receives an analog voltage of a speed instruction outputted to the analog amplifier 20, and converts the analog voltage into a predetermined voltage, and an A/D converter 15 which converts the analog voltage from the amplifier 14 into a digital value, and outputs the digital value to the CPU 11, and in that enable signal processing and emergency stop signal processing, as will be described below, are performed. In FIG. 1, components corresponding to those of the prior art shown in FIG. 6 are denoted by the same reference numerals.

In the numerical control device 10 shown in FIG. 1, similarly to the conventional numerical control device (in FIG. 6), the CPU (processing unit) 11 obtains a speed instruction to analog spindle control, and determines an analog voltage output value corresponding to the obtained speed instruction. Then, the CPU 11 writes a digital value corresponding to the analog output value into the D/A (digital/analog) converter 12. On the other hand, the D/A converter 12 converts the written digital value into an analog value and outputs the converted analog voltage. The amplifier 13 amplifies the outputted analog voltage. Then, the amplifier 13 outputs the amplified analog voltage as a speed instruction to the analog amplifier 20.

Further, the speed instruction (analog voltage) outputted from the amplifier 13 is inputted into the amplifier 14. In the amplifier 14, the amplitude of input voltage is attenuated so as to be adapted to an input voltage range of the A/D (analog/digital) converter 15. Then, the output of amplifier 14 is inputted into the A/D converter 15. The analog value inputted into the A/D converter 15 is converted into a digital value, which is inputted into the CPU 11. The CPU 11 performs processing, as will be described below, on the basis of the output (of digital value) of the A/D converter 15, and thereby performs ON/OFF control of the enable signal and the emergency stop signal.

Also, similarly to the conventional case, the CPU 11 outputs the enable signal to the analog amplifier 20 via the driver 16. Further, the CPU 11 outputs the emergency stop signal to the electromagnetic switch 21 via the driver 17. The electromagnetic switch 21 supplies electric power to the analog amplifier 20 from the three phase AC power source 22 for motor driving.

Figure 2:
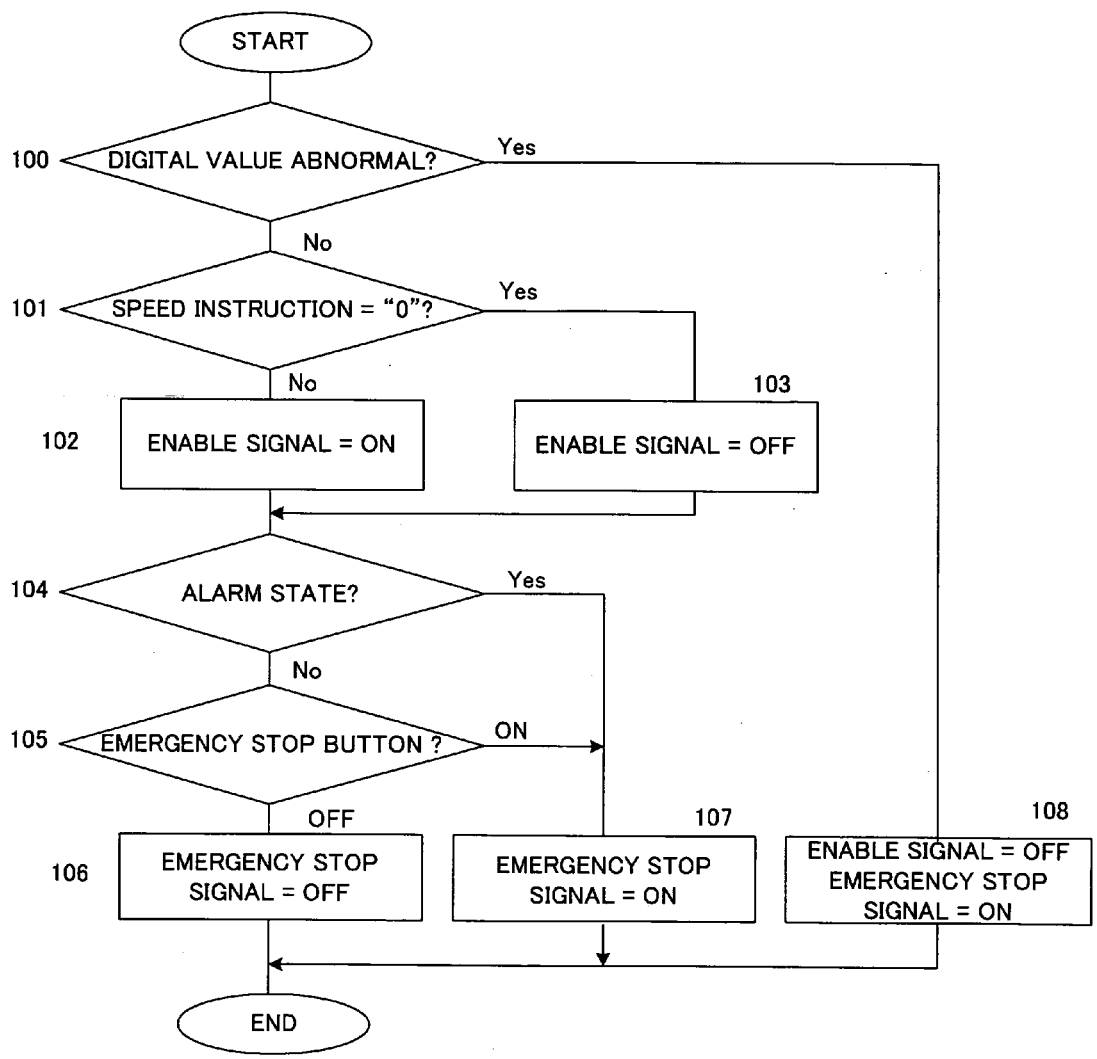
FIG. 2 is a flow chart showing an embodiment of sending out processing of an enable signal and an emergency stop signal, which is performed by a CPU of the numerical control device in FIG. 1 at each specified period.

FIG. 2 is a flow chart showing sending out control processing of the enable signal and the emergency stop signal, which is performed by the CPU 11 of the numerical control device 10 according to the present embodiment at each specified period.

The CPU 11 reads the digital value (value corresponding to the speed instruction outputted to the analog amplifier 20) outputted from the A/D converter 15 and judges whether the digital value is within a predetermined range or not (step 100). Here, the judgment on whether the output value (digital value) from the A/D converter 15 is within the predetermined range or not, corresponds to the judgment on whether the speed instruction (analog value) outputted to the analog amplifier 20 is a normal value or not.

For example, in the case where the analog voltage of the speed instruction outputted to the analog amplifier 20 is determined to be abnormal if the analog voltage deviates from a range between −10 V and +10 V, the digital value (output from the A/D converter 15) corresponding to this range is set by means of a parameter and the like. FIG. 3 is a table showing an example of the judgment on whether a digital value corresponding to a speed instruction is normal or not, in the case where the range to be judged as normal is set to the range of analog voltage from −10 V to +10 V. When the digital value which is the output from the A/D converter 15 is within the range between the lower limit value of "00101010" and the upper limit value of "11010101", the digital value is judged to be normal. When the digital value deviates from this range, it is judged to be abnormal.

In step 100, when the digital value (output from the A/D converter 15) corresponding to the speed instruction outputted to the analog amplifier 20 is judged to deviate from the normal range set by a parameter and the like, the sending out of the enable signal to the analog amplifier 20 is stopped. Further, the emergency stop signal is outputted to the electromagnetic switch 21 via the driver 17 so as to make the electromagnetic switch 21 open, as a result of which the electric power supply from the three phase AC power source for motor driving to the analog amplifier 20 is interrupted (step 108).

When the digital value (output from the A/D converter 15) is judged to deviate from the normal range, instead of performing both of the processing for stopping the sending out of the enable signal and the processing of outputting the emergency stop signal to the electromagnetic switch 21, as described above, only one of the two kinds of processing may be performed. For example, if the processing in which the sending out of the enable signal to the analog amplifier 20 is stopped but the emergency stop signal is not sent out to the electromagnetic switch 21, is performed, the supply of the electric power to the analog amplifier is continued. Thus, the motor can be stopped in an emergency by stopping the sending out of the enable signal, when the analog voltage is judged to be abnormal.

When the sending out of the enable signal to the analog amplifier 20 is stopped, the analog amplifier 20 is controlled so as to make the speed of the motor 23 driven by the analog amplifier 20 become "0". Further, the supply of the electric power via the electromagnetic switch 21 is interrupted, as a result of which the motor 23 is stopped.

On the other hand, when the digital value (output from the A/D converter 15) corresponding to the speed instruction (analog voltage) outputted to the analog amplifier 20 is within the predetermined range and judged to be normal, it is judged whether the speed instruction obtained in the present cycle is "0" or not (step 101). If the speed instruction is not "0", the enable signal is outputted to the analog amplifier 20 via the driver 16 (step 102).

While the enable signal is sent out to the analog amplifier, the analog amplifier 20 judges the speed instruction inputted into the analog amplifier 20 to be effective, and drives the motor 23 at a speed in proportion to the analog voltage corresponding to the speed instruction. As described above, the speed instruction inputted to the analog amplifier 20 is a signal obtained by converting the speed instruction (digital value) outputted from the CPU 11 into an analog voltage by the D/A converter 12, and further by amplifying the converted analog voltage by the amplifier 13.

If the speed instruction is "0", the sending out of the enable signal to the analog amplifier 20 is stopped (step 103). Then, the analog amplifier 20 controls the motor 23 so as to make the speed of the motor become "0". Or the current outputted to the power line 24 is stopped.

Then, the CPU 11 judges whether an alarm state is generated or not (step 104). When no alarm state is generated, the CPU 11 judges whether the emergency stop button is pushed or not (step 105). When the CPU 11 judges that an alarm state is generated or that the emergency stop button is pushed, it outputs the emergency stop signal to the electromagnetic switch 21 via the driver 17, so as to make the electromagnetic switch 21 open. As a result, the electric power supply from the three phase AC power source 22 for motor driving to the analog amplifier 20 is interrupted (step 107).

Further, when no alarm state is generated and the emergency stop button is not pushed, the CPU 11 prevents the emergency stop signal from being sent out to the electromagnetic switch 21, and allows the electric power to be supplied to the analog amplifier 20 from the three phase AC power source 22 for motor driving (step 106).

Hereafter, the CPU 11 executes the above described processing at each predetermined period, to control the enable signal and the emergency stop signal.

Figure 4:
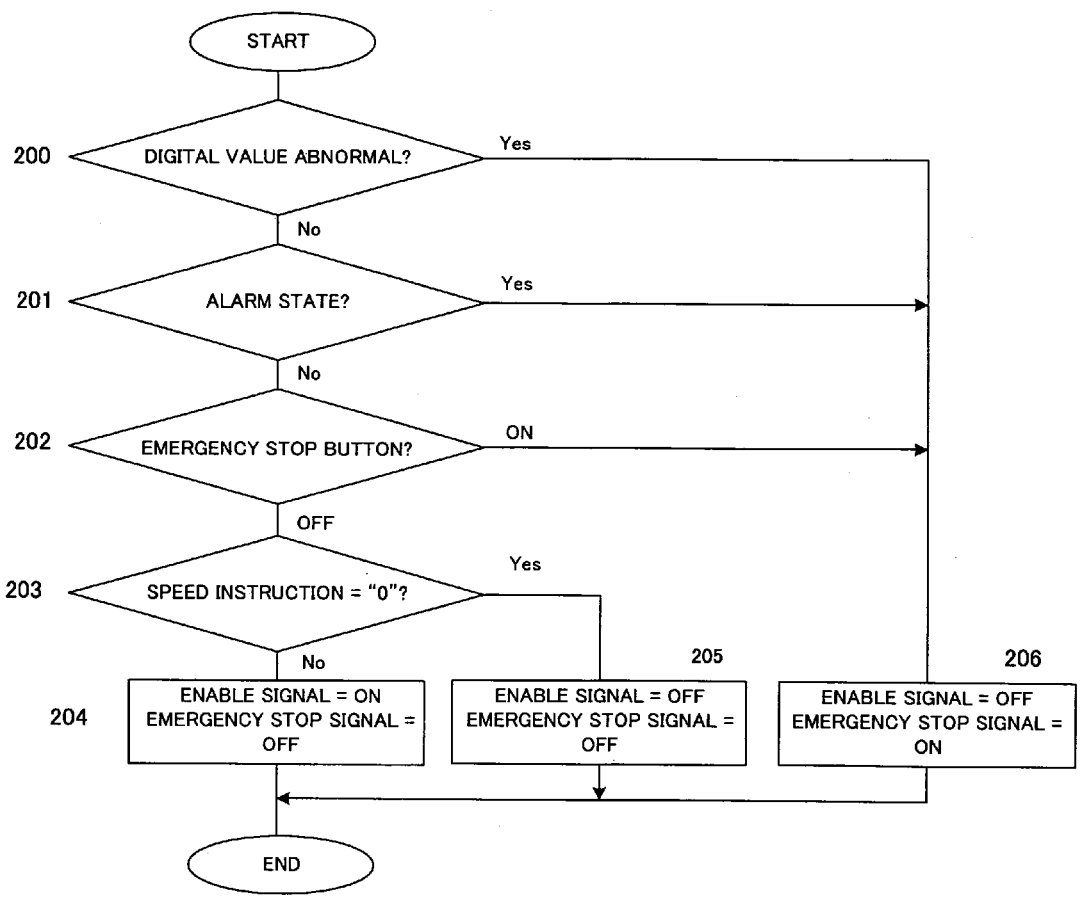
FIG. 4 is a flow chart showing another embodiment of sending out processing of the enable signal and the emergency stop signal, which is performed by the CPU of the numerical control device in FIG. 1 at each specified period.
Figure 5:
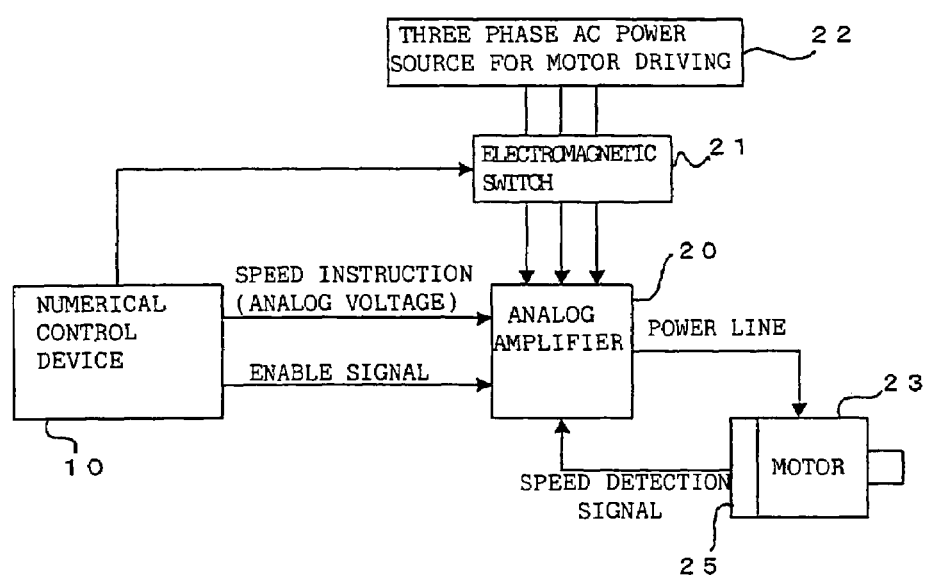
FIG. 5 shows a system configuration of the analog spindle motor control performed by the conventional numerical control device.

FIG. 4 is a flow chart showing the sending out processing of the enable signal and the emergency stop signal, performed by the CPU 11 of the numerical control device of another embodiment according to the present invention, at each specified period.

The processing shown in FIG. 4 is different from the processing shown in FIG. 2 in that when an alarm state is generated, and when the emergency stop button is pushed, the sending out of the enable signal is also stopped.

The CPU 11 of the numerical control device 10 reads the digital value (value corresponding to the speed instruction outputted to the analog amplifier 20) outputted from the A/D converter 15, and then judges whether the digital value is within a predetermined range or not (step 200).

In step 200, when the CPU 11 judges that the digital value (output from the A/D converter 15) corresponding to the speed instruction (analog voltage) outputted to the analog amplifier 20 deviates from a normal range predetermined by a parameter and the like (is an abnormal value), the CPU 11 stops sending out the enable signal to the analog amplifier 20. Further, the CPU 11 outputs the emergency stop signal to the electromagnetic switch 21 via the driver 17, and makes the electromagnetic switch 21 open so as to interrupt the electric power supply from the three phase AC power source for motor driving to the analog amplifier 20 (step 206).

When the CPU 11 judges that the digital value (output from the A/D converter 15) deviates from the normal range, it may only output the emergency stop signal to the electromagnetic switch 21. However, in the present example, the sending out of the enable signal to the analog amplifier 20 is also stopped for safety sake.

On the other hand, when the digital value (output from the A/D converter 15) is within the normal range, the CPU 11 then judges whether an alarm state is generated or not (step 201). When no alarm state is generated, the CPU 11 then judges whether the emergency stop button is pushed or not (step 202). When the emergency stop button is not pushed, the CPU 11 then judges whether the speed instruction is "0" or not (step 203).

When the speed instruction is "0", the CPU 11 stops sending out the enable signal to the analog amplifier 20, and prevents the emergency stop signal from being sent out to the electromagnetic switch 21 from the driver 17 (step 205). This enables the closed state of the electromagnetic switch 21 to be maintained, and the electric power to be supplied to the analog amplifier 20 from the three phase AC power source 22 for motor driving. However, as the enable signal is not sent out to the analog amplifier 20, the analog amplifier 20 is controlled so as to make the speed of the motor 23 become "0", or the current outputted to the power line 24 is interrupted. As a result, the motor 23 is stopped.

When the speed instruction is not "0", the CPU 11 sends out the enable signal to the analog amplifier 20, and prevents the emergency stop signal from being sent out to the electromagnetic switch 21 from the driver 17 (step 204). As the emergency stop signal is not sent out to the electromagnetic switch 21, the electric power is supplied to the analog amplifier 20 via the electromagnetic switch 21. In addition, as the enable signal is sent out, the analog amplifier 20 drives the motor 23 at a speed in proportion to the speed instruction (analog voltage) outputted from the amplifier 13.

In each embodiment described above, it is judged whether or not the digital value obtained through the amplifier 14 and the A/D converter 15 from the speed instruction (analog voltage) outputted to the analog amplifier 20, is within a range predetermined by a parameter and the like. Thereby, it is judged whether the speed instruction value is normal or not. Alternatively, the processing in step 100 and step 200 may be changed such that the CPU 11 compares the obtained speed instruction value with the value of the speed instruction which is outputted to the analog amplifier 20, and which is fed back via the A/D converter 15, and judges that the speed instruction value is abnormal when the difference between the values deviates from a range predetermined by a parameter and the like.

In such processing of abnormality judgment, even slight abnormality of the speed instructions can be detected by narrowing the setting range to be judged as normal. However, the analog spindle control system by mean of the numerical control device may malfunction under the influence of noise, depending upon an environment in which the system is installed. Therefore, in the analog spindle control system, the safety and the noise resistance are balanced by making the setting range variable.

The invention claimed is:

1. A numerical control device which converts a speed instruction of digital value to an analog voltage and outputs the analog voltage to an analog amplifier which rotates a motor at a speed in proportion to the analog voltage, said numerical control device comprising:

an A/D converter converting the analog voltage of said speed instruction into a digital value;

monitoring means for monitoring the digital value converted by said A/D converter, and judging whether the digital value is within a predetermined range or not; and enable signal sending means for sending out an enable signal notifying validity of said analog voltage, to said analog amplifier, wherein when said monitoring means judges that the digital value deviates from the predetermined range, the sending out of the enable signal by said enable signal sending means is stopped, and an instruction to stop driving the motor or an instruction to stop electric power supply to the motor, is sent to said analog amplifier.

2. A numerical control device which converts a speed instruction of digital value to an analog voltage and outputs the analog voltage to an analog amplifier which rotates a motor at a speed in proportion to the analog voltage, said numerical control device comprising:

an A/D converter converting the analog voltage of said speed instruction into a digital value;

monitoring means for monitoring the digital value converted by said A/D converter, and judging whether the digital value is within a predetermined range or not; and emergency stop signal sending means for sending out an emergency signal for interrupting electric power inputted into the analog amplifier, wherein when said monitoring means judges that the digital value deviates from the predetermined range, the emergency stop signal is sent out by said emergency stop signal sending means, and the electric power inputted into said analog amplifier is interrupted.

3. The numerical control device according to claim 1 or claim 2, which comprises, in place of said monitoring means, monitoring means comparing said speed instruction of digital value with the digital value converted by said A/D converter, and judging whether the difference between the digital values is within a predetermined range or not.

4. The numerical control device according to claim 1, claim 2 or claim 3, wherein said predetermined range is set by means of a parameter.

* * * * *

UNITED STATES PATENT AND TRADEMARK OFFICE
CERTIFICATE OF CORRECTION

| | | |
|---|---|---|
| PATENT NO. | : 7,148,647 B2 | Page 1 of 1 |
| APPLICATION NO. | : 11/239167 | |
| DATED | : December 12, 2006 | |
| INVENTOR(S) | : Kazunari Aoyama et al. | |

It is certified that error appears in the above-identified patent and that said Letters Patent is hereby corrected as shown below:

Column 8, Line 33, change "claim 1 or claim 2," to --claim 1,--.

Column 8, Line 40, delete "claim 2 or claim 3," before "wherein".

Signed and Sealed this

First Day of May, 2007

JON W. DUDAS
*Director of the United States Patent and Trademark Office*